Patented Jan. 5, 1932

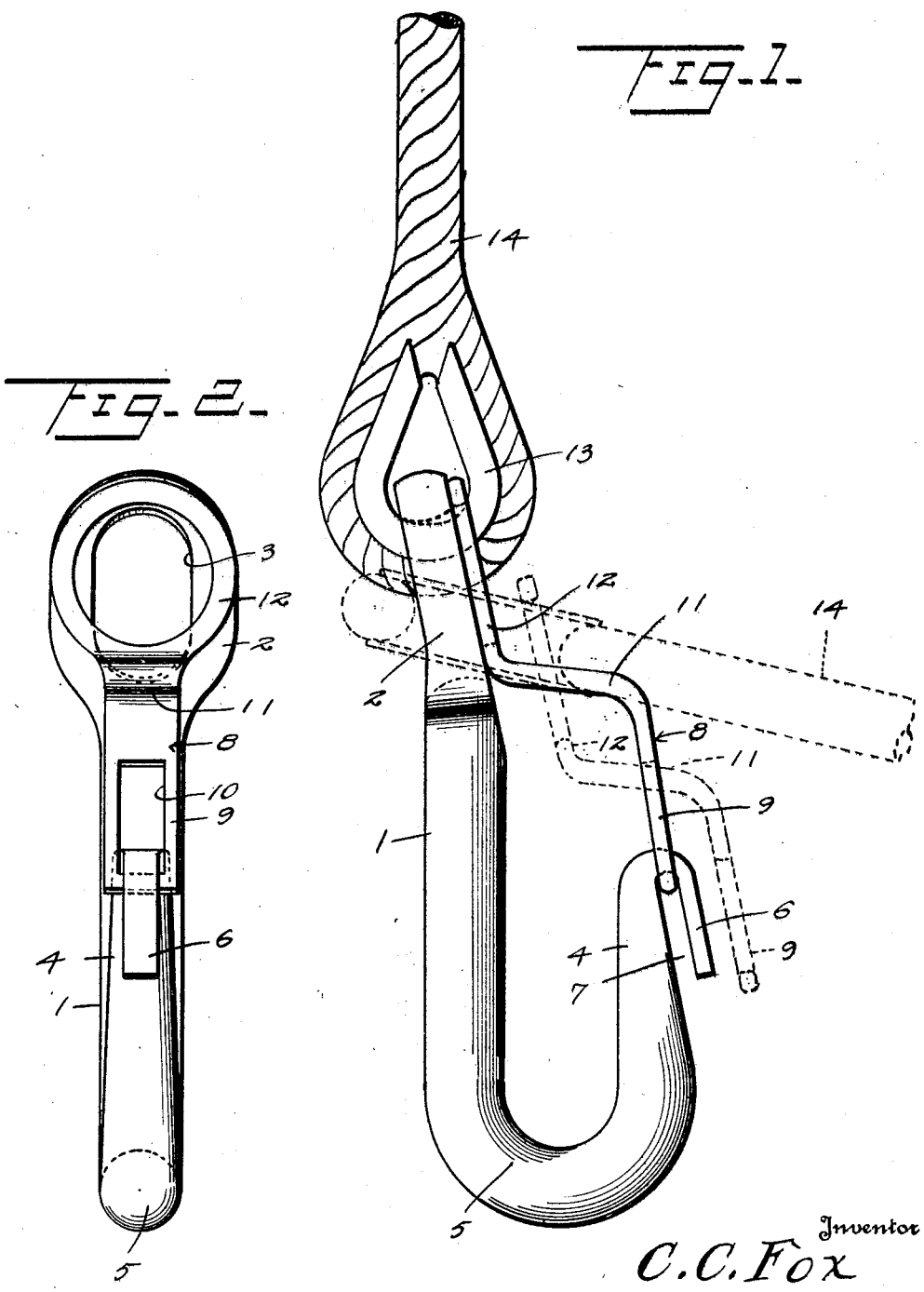

1,839,838

UNITED STATES PATENT OFFICE

CLAUDE C. FOX, OF HOQUIAM, WASHINGTON

SAFETY-HOOK

Application filed May 2, 1931. Serial No. 534,624.

This invention relates to improvements in hooks and pertains particularly to a safety hook or a hook that will not become unlocked and, while it may be employed in any manner in which is found suitable, it is particularly designed for use in connection with towing operations and such operations where it is particularly desirable that a cable be securely held in connection with a body under all conditions.

The primary object of the present invention is to provide a hook which may be easily and quickly connected with an eye or with a cable or chain and which will not become disconnected while in use, even though the rope or cable, by which it is carried, may be slackened.

A further object of the invention is to provide a hook of the above described character which is of simple design and thus capable of being easily manipulated to lock it or unlock it, and which is of strong and durable construction.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in side elevation of the hook embodying the present invention, showing a cable applied thereto and showing in dotted lines the manner in which the guard is released.

Figure 2 illustrates the hook per se in front elevation.

Referring more particularly to the drawings, wherein like numerals of reference indicate corresponding parts throughout the several views, the numeral 1 indicates the shank portion of the present hook, upon one end of which is formed a head 2 which is slightly flattened, as shown, and which has therein the elongated eye 3. This head is disposed with its faces at a very slight oblique angle to the shank 1. At the opposite end of the shank there is formed the bill 4, the bight portion which connects the bill with the shank being indicated by the numeral 5. As illustrated, the inclination of the eye or head 2 is away from the side of the shank upon which the bill 4 is located.

The tip of the bill has formed integral therewith the outwardly and rearwardly turned tongue 6 which is slightly spaced from the bill providing the recess or passage 7.

Disposed across the area between the bill of the hook and the face of the head 2 is a guard member which is indicated generally by the numeral 8. This guard comprises the elongated flat lower portion 9 in which is formed a longitudinally extending opening 10, the angularly disposed intermediate portion 11, and the upper ring portion 12 which is substantially parallel with the lower portion 9.

In use the guard 8 is arranged with the ring 12 against the face of the head 2 nearest the bill 4, which face will be hereinafter designated as the inner face of the head. The ring 12 and eye 3 of the head have engaged therethrough the loop 13 of a rope or cable 14. This loop is permitted slight movement longitudinally in the eye 3, this movement also being longitudinally of the hook as a whole. When the cable 14 is pulled away from the hook the guard 8 will be shifted slightly toward the top of the head and, in order to engage the lower portion 9 with the tongue 6, the loop of the cable must be allowed to move in the opposite direction and turned downwardly, as indicated by the dotted line position, so that the guard may slide forwardly on the loop away from the head 2. This brings the opening 10 in the lower part 9 of the guard into a position where it may be swung inwardly to have the tongue 6 extended through the opening thereof and then upon returning the cable to the full line position shown the tongue 6 will be extended through the opening of the guard and thus secure the same in position across the hook between the bill and the head so that a ring or other member engaged by the hook cannot slip off of the bill.

From the foregoing description it will be readily seen that a hook of this character is particularly suitable as a cable hook, boom hook, tow hook, raft and rope hook, and may also be used for towing automobiles and tying animals. It will also be readily seen that the hook may be made in any size desirable.

Having thus described the invention, what is claimed is:

1. A hook structure of the character described, comprising a shank having an eye at one end and a bill at the other end, a guard member disposed across the hook between the eye and the bill, the guard being held in one position against the front of the eye by a body connected in the eye and engaging an aperture in the guard, and a coupling between the guard and the bill of the hook of a character to be released only by the moving of the guard outwardly from the face of the eye and longitudinally of the hook.

2. A hook structure of the character described, comprising a shank, a head formed at one end of the shank and having an aperture therethrough, a bill formed at the other end of the shank, a tongue formed integral with the end of said bill and extending backwardly from the tip thereof and in spaced parallel relation thereto, and a guard member comprising an elongated body having a ring at one end to position over the eye of the head and further having an opening at its other end adapted to have said tongue extended therethrough, said ring, when in position directly over said eye, having the tongue securely engaged in the aperture of the guard.

3. A hook structure of the character described, comprising a shank having an eye formed at one end, a bill formed at the opposite end of the shank and having a straight terminal portion, a tongue forming an integral continuation of said bill and turned back to extend over and parallel with the outer face of said straight portion, said tongue being of less length than the straight terminal portion of the bill, and a guard comprising an elongated body having one end portion provided with an eye which is designed to position against the outer face of the eye of the shank, the other end of said guard body being straight and having an elongated slot therein for the reception of said tongue, said guard body having an intermediate portion extending across the area between said shank and bill.

In testimony whereof I hereunto affix my signature.

CLAUDE C. FOX.